H. TREDUP.
TRACTION WHEEL.
APPLICATION FILED OCT. 3, 1916.
1,214,391.
Patented Jan. 30, 1917.
2 SHEETS—SHEET 1.
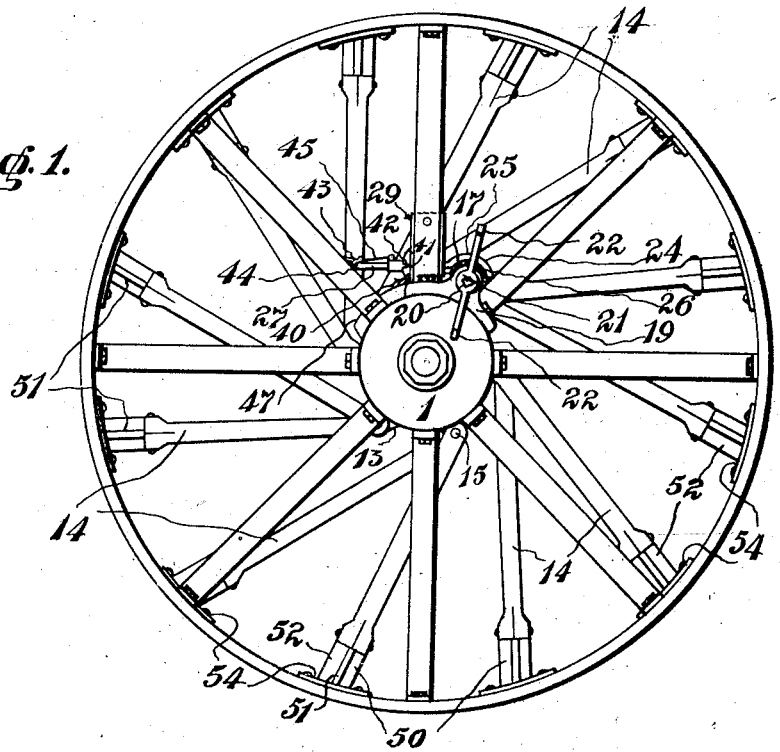
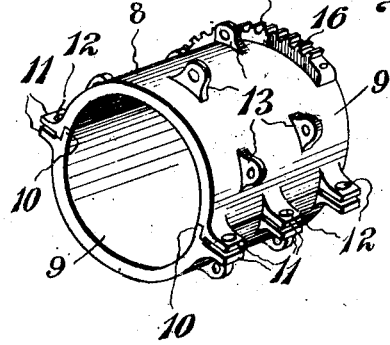
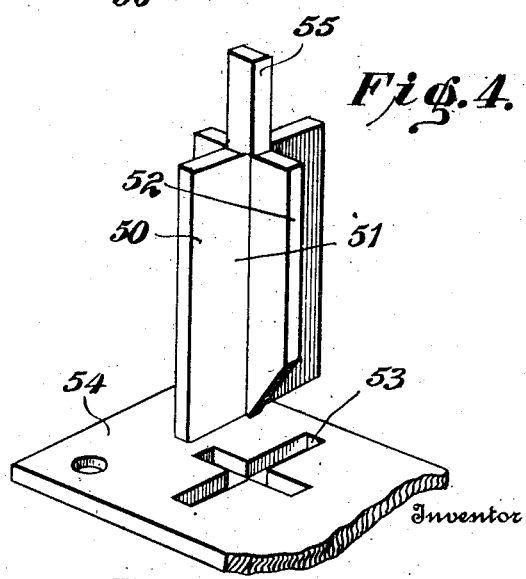
Witnesses
Inventor
Herman Tredup
By Victor J. Evans
Attorney

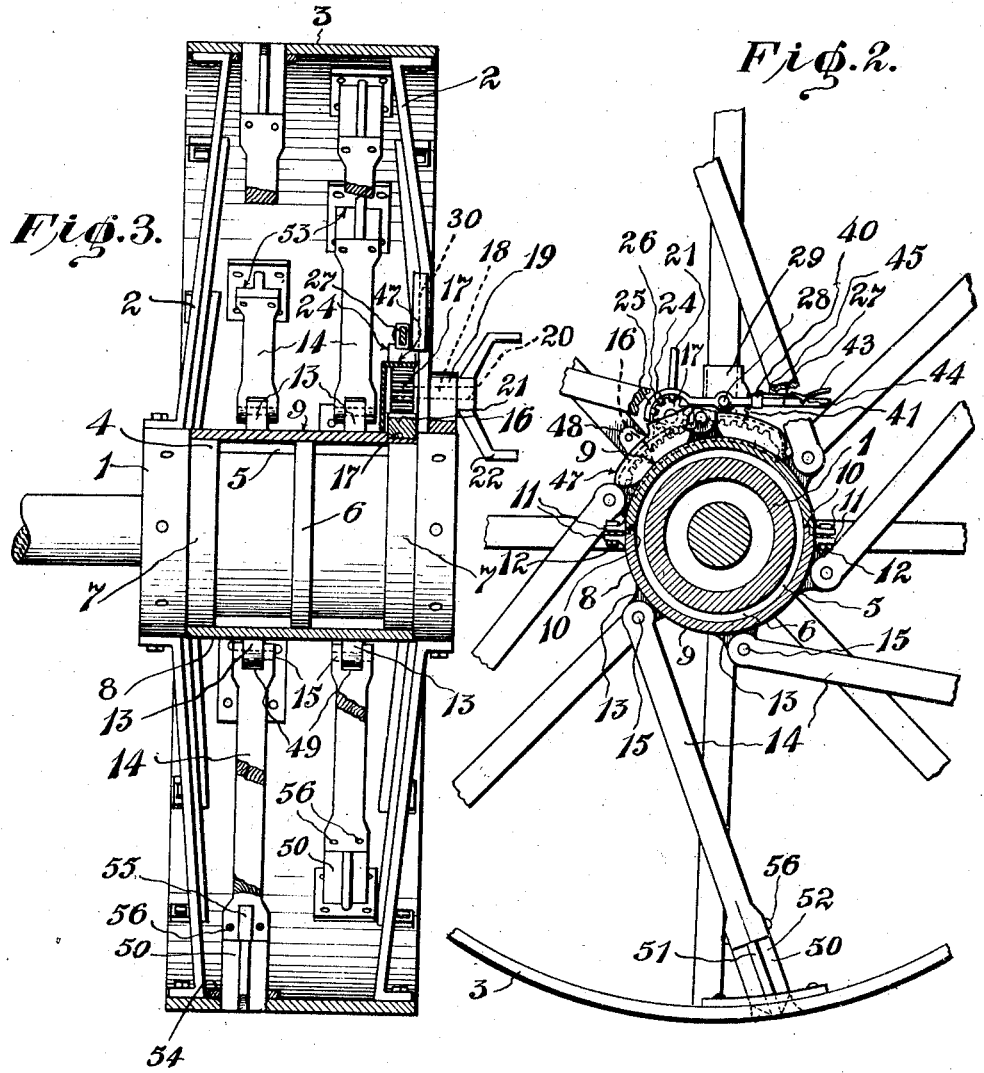

UNITED STATES PATENT OFFICE.

HERMAN TREDUP, OF SEBEWAING, MICHIGAN.

TRACTION-WHEEL.

1,214,391.  Specification of Letters Patent.  Patented Jan. 30, 1917.

Application filed October 3, 1916. Serial No. 123,546.

*To all whom it may concern:*

Be it known that I, HERMAN TREDUP, a citizen of the United States, residing at Sebewaing, in the county of Huron and State of Michigan, have invented new and useful Improvements in Traction-Wheels, of which the following is a specification.

This invention relates to improvements in traction wheels for use on traction engines and other motor vehicles, the object of the invention being to provide a wheel of this character with tractor elements of improved construction which may be radially projected from the rim of the wheel or withdrawn as may be desired and to adapt the wheel for use either on soft earth or on road surfaces as the case may be.

Another object of the invention is to provide improved means for operating the tractor elements.

The invention consists in the features of construction, combination, and arrangement of devices, hereinafter fully described and claimed.

In the accompanying drawings:—Figure 1 is an elevation of a tractor wheel constructed and arranged in accordance with my invention. Fig. 2 is a detail sectional view of the same. Fig. 3 is a detail transverse sectional view of the same. Figs. 4 and 5 are detail views.

The hub of the wheel is indicated at 1; the spokes at 2 and the rim at 3. The wheel is here shown as provided with two sets of spokes and the hub is provided at a point between the two sets of spokes with an annular circumferential groove 4 which is provided with spaced depressed portions 5 so that an annular flange 6 is formed at the center of the recess and flanges 7 are formed at the sides thereof. Preferably the hub is made of steel or iron. The flanges 6, 7, may be constructed of tempered steel rings.

A collar 8 is fitted in the groove 5 for oscillating motion on the hub and is composed of segments 9 which are formed with overlapping joints 10 and are also formed with radially projecting lugs 11 at opposite sides of the joints and which lugs are provided with openings for the reception of bolts 12 whereby the segments of the collar are bolted together. The collar segments are also provided with outwardly projecting lugs 13 to which the inner ends of the tractor elements 14 are pivotally connected by bolts 15.

A spurred segment 16 is fitted in a segmental recess 17 in the outer side of one of the segments 9 of the collar and is suitably secured as by means of bolts. This spurred segment is engaged by a pinion 17 which is mounted on a shaft 18, said shaft being mounted in a bearing 19 which is secured on the hub. The outer end of the shaft is squared as at 20 and thereby adapted to be engaged by a crank 21 which crank is provided with two handles 22. By the provision of the two handles, the crank can be grasped by both hands or two persons may operate the crank to cause the pinion 17 to be turned in one direction or the other and hence cause the pinion to coact with the spurred segment 16 to turn the collar in the direction required to project or withdraw the traction elements as may be desired.

A dog 24 is provided to engage the pinion and thereby lock the same to hold the tractor elements in extended or retracted position as may be required. The dog has a segmental portion 25 to partially cover the pinion and which segmental portion is provided on its inner side with teeth 26 to engage several of the teeth of the pinion. The dog also has an outwardly extending lever arm 27 and is pivotally mounted as at 28 on a clip 29 which is channeled on one side as at 30 to receive one of the spokes, said clip being secured to said spoke. The clip is also provided with lock notches 40, 41, either of which may be engaged by a locking bolt 42 which is slidably mounted on the dog and is operated by a trip lever 43 which is mounted on the lever 27 of the dog as at 44 and is connected to the locking bolt by a rod or wire 45.

The gear segment 16 is incased by a housing 47 which also partly incases the pinion 17, the said housing being preferably made of sheet metal and being secured by angle members 48 to certain of the spokes of the wheel. The casing protects the segment gear and the pinion from mud, gravel, stones, and the like.

Each tractor element 14 has a bifurcated inner end 49, and is provided at the outer end with a detachable spur 50. Each of the said spurs comprises a web 51 arranged transversely with respect to the wheel rim and brace webs 52 at opposite sides of and at the center of the web 51, the spur being cross shaped in plan and operating in a cross shaped slot 53 in a plate 54. The said plates are bolted or riveted to the rim of the wheel and the rim wheel is also provided with cross shaped slots to clear the spurs of the traction elements. Each spur has an extension 55 at its inner end which fits in a socket in the outer end of the element 14 and is secured to the element 14 by rivets or bolts 56. Hence the tractor spurs when worn or broken may be readily detached from the tractor elements and renewed.

When the tractor elements are projected, their spurs extend beyond the periphery of the wheel and are adapted to engage in soft earth or the like to greatly increase the traction power of the wheel and hence enable the wheel of the tractor engine or other motor vehicle to be successfully operated under such conditions. When the vehicle is to operate on a hard road surface, the tractor elements may be drawn inwardly so that their tractor spurs will not project beyond the wheel rim. The tractor elements may be arranged at any desired adjustment, the dog 24 being adapted to lock the pinion and the locking block and its connections serving to lock the dog in either engaged or disengaged position with respect to the pinion as will be understood.

The parts of the tractor wheel may be made of any suitable material.

While I have herein described and shown a preferred form of my invention, I would have it understood that the device shown is merely illustrative and that such changes may be made when desired as are within the scope of the appended claim.

Having described the invention, what is claimed is:

In combination with a wheel, a sleeve mounted for oscillating movement on the wheel and having a segment gear, a pinion engaging said segment gear and having a shaft mounted in a bearing on the hub, tractor elements pivotally connected to the collar and adapted to be projected and withdrawn by the movements of the collar, means to enable said pinion to be manually turned, a dog pivotally mounted on one of the wheel spokes and arranged to engage the pinion, and means to lock the dog in engaged or disengaged position.

In testimony whereof I affix my signature.

HERMAN TREDUP.

Copies of this patent may be obtained for five cents each, by addressing the "Commissioner of Patents, Washington, D. C."